United States Patent [19]

Miller

[11] Patent Number: 5,623,891
[45] Date of Patent: Apr. 29, 1997

[54] INTERNAL FAULT INDICATOR FOR A TRANSFORMER

[75] Inventor: Lloyd D. Miller, Pine Bluff, Ark.

[73] Assignee: Central Moloney, Inc., Pine Bluff, Ark.

[21] Appl. No.: 374,232

[22] Filed: Jan. 18, 1995

[51] Int. Cl.⁶ ............................................. G01L 19/12
[52] U.S. Cl. .................................... 116/271; 116/268
[58] Field of Search ............................ 116/266, 268, 116/270, 271, 285, DIG. 25, 284, 302, 303, 34 R, 297, 298; 137/557

[56] References Cited

U.S. PATENT DOCUMENTS

| | | | |
|---|---|---|---|
| 2,800,795 | 7/1957 | Trinca | 116/271 X |
| 3,022,764 | 2/1962 | Scavuzzo et al. | 116/271 |
| 3,110,284 | 11/1963 | Napier | 116/284 |
| 3,129,690 | 4/1964 | Nygard | 116/266 X |
| 3,247,824 | 4/1966 | Rodgers | 116/271 |
| 3,999,503 | 12/1976 | Brannis et al. | 116/34 R |
| 4,240,372 | 12/1980 | Davis | 116/271 |
| 4,494,566 | 1/1985 | Sinclair et al. | 116/302 X |
| 5,078,078 | 1/1992 | Cuk | 116/272 |

FOREIGN PATENT DOCUMENTS 1558414  1/1980  United Kingdom .................. 116/270

Primary Examiner—William A. Cuchlinski, Jr.
Assistant Examiner—Willie Morris Worth
Attorney, Agent, or Firm—Sixbey, Friedman, Leedom & Ferguson

[57] ABSTRACT

The internal fault indicator includes an open ended housing mounted in an opening in the wall of a transformer casing. An indicator lens is attached over a first open end of the housing and a diaphragm is attached over a second open end of the housing with the second end of the housing being positioned so that the diaphragm is subjected to internal pressure surges within the transformer. The diaphragm carries a trigger retainer which engages a trigger on an indicator shaft mounted for rotation within the housing. An indicator is mounted on the indicator shaft beneath the lens, and a bias spring is connected to the indicator shaft to bias the shaft toward rotation relative to the housing when the trigger is engaged with the trigger retainer. When the diaphragm moves in response to a pressure surge in the transformer, the trigger retainer moves away to release the trigger, and the bias spring rotates the indicator shaft and indicator so that a warning section on the indicator is positioned for viewing through the lens.

9 Claims, 1 Drawing Sheet

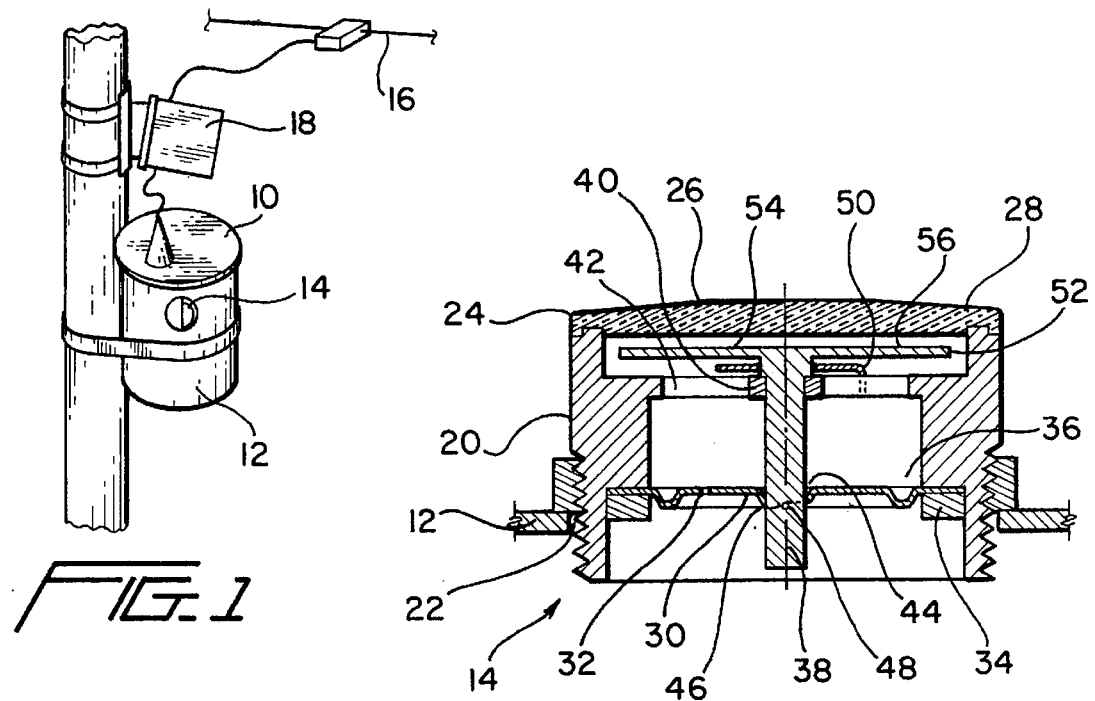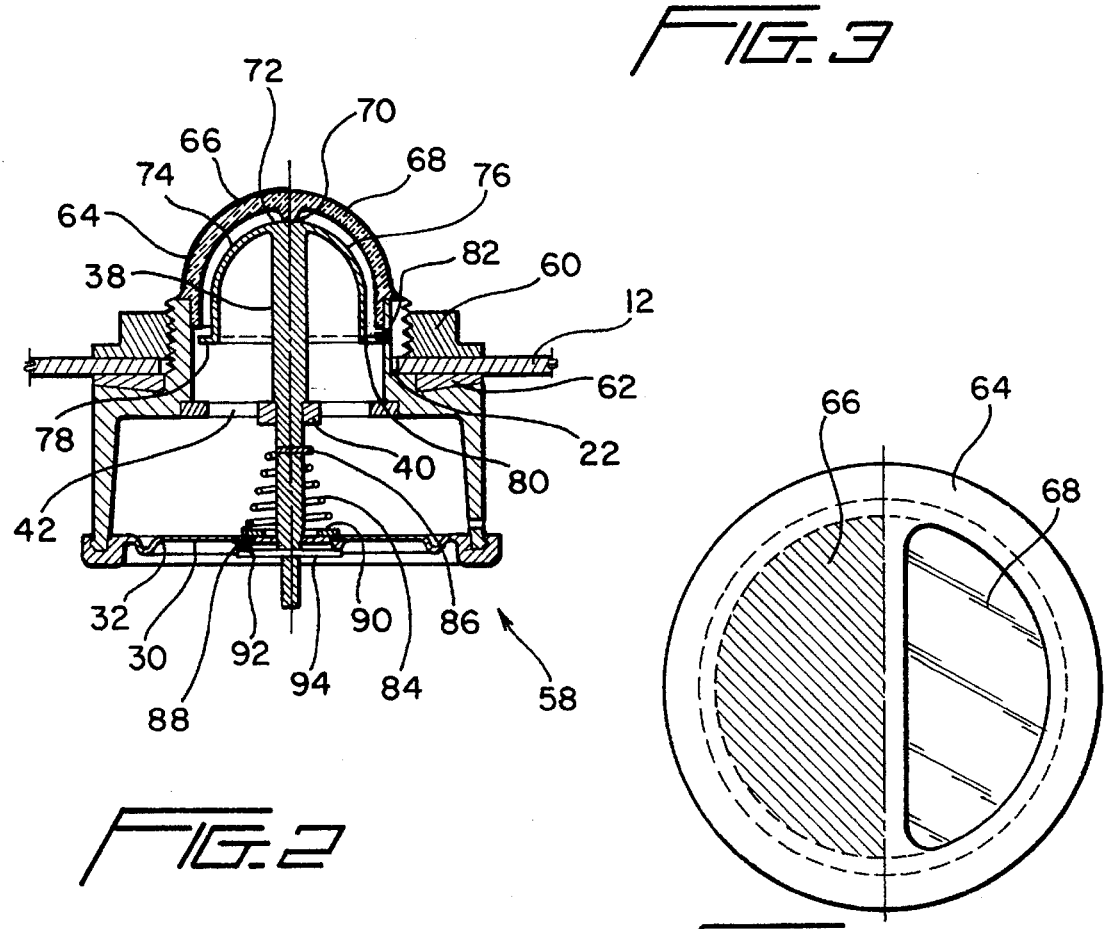

INTERNAL FAULT INDICATOR FOR A TRANSFORMER

TECHNICAL FIELD

The present invention relates generally to a warning indicator for a power transformer and more particularly to a mechanical internal fault indicator which responds to pressure surges within the transformer casing resulting from an internal arcing fault to provide an indication that an internal fault has occurred.

BACKGROUND OF THE INVENTION

It has been well established that insulation failures in oil filled equipment invariably increase pressure within the sealed enclosures housing the device (i.e. a capacitor or a transformer). However, external short-circuits, and even changes in the ambient temperature will also generate pressure variations, but tests with distribution transformers have shown that the pressure rise for external faults is gradual and pressure rises at a constant rate as long as fault current flows. For internal faults, a rapid pressure rise to dangerously high peak pressures can occur, for there is a transient surge in pressure inside a transformer when an internal arcing fault occurs.

Nearly all pole mounted distribution transformers are protected by fused cutouts that operate and visibly disconnect the transformer from the line if there is an overload or fault. When there is an internal fault, reenergizing the transformer can have serious consequences. In a worst case scenario, the tank can rupture, ejecting insulating oil and shards into the surroundings, thereby putting the lineman at risk. There are special tools which must be used and procedures the lineman must follow when reenergizing a transformer to guard against undetected internal faults. In the past, the only foolproof method to check for internal faults was to disconnect the transformer and perform specific measurements.

Power utilities have adopted diverse inspection methods and other precautionary measures to reduce the hazards involved in reenergizing a faulted distribution transformer, but a much simpler and far safer solution is provided by recently developed internal fault indicators. For example, U.S. Pat. No. 5,078,078 to Nikola Cuk discloses a piston activated warning indicator which provides an indication that a transient overpressure condition has occurred within a transformer. Pressure within the transformer housing drives the piston outwardly from the housing and raises a cup-like member attached to the piston away from an indicator ring clip. It is intended that a lineman will observe this ring clip when an external inspection of the transformer occurs and thereby become aware of the fact that them has been a pressure surge due to an internal fault in the transformer.

Although the Cuk patented transformer internal fault indicator operates effectively in most instances, it is subject to several disadvantages. For a fault indication to be noticed, the cup-like member must physically move outwardly away from the transformer housing for a distance sufficient to fully expose the underlying indicator ring clip, and must remain in this position until an inspection is made. Since the piston which drives the cup-like member operates against the bias of a spring, this spring attempts to return the cup-like member to its original position over the indicator ring clip. Any external force applied to the cup-like member may aid the spring in causing movement of the piston back inwardly of the transformer housing, thereby partially or totally obscuring the indicator ring clip. Also, since the indicator ring clip must be observed in the limited space between the transformer housing and the extended cup-like member, it is often not readily noticed, particularly from a distance.

DISCLOSURE OF THE INVENTION

It is a primary object of the present invention to provide a novel and improved internal fault indicator for a power transformer which provides a positive warning indication upon the occurrence of an internal fault.

Another object of the present invention is to provide a novel and improved internal fault indicator for a power transformer which provides a highly visible indication of an internal fault.

A further object of the present invention is to provide a novel and improved internal fault indicator for a power transformer which includes an indicator which is spring biased when in a nonindicating position and which is not subjected to a substantial spring bias which would tend to reset the indicator once a warning indication occurs.

A still further object of the present invention is to provide a novel and improved internal fault indicator for a power transformer which does not move laterally relative to the transformer housing and which cannot be reset accidentally by the application of an external force to the indicator.

These and other objects of the present invention include the provision of an internal fault indicator having an open ended housing mounted in an opening in the wall of a transformer. An indicator lens is attached over a first open end of the housing and a diaphragm is attached over a second open end of the housing, with the second end of the housing being positioned so that the diaphragm is subjected to internal pressure surges within the transformer. The diaphragm carries a trigger retainer which engages a trigger on an indicator shaft mounted for rotation within the housing. An indicator is mounted on the indicator shaft beneath the lens, and a bias spring is connected to the indicator shaft to bias the shaft toward rotation relative to the housing when the trigger is engaged with the trigger retainer. When the diaphragm moves in response to a pressure surge in the transformer, the trigger retainer moves away to release the trigger, and the bias spring rotates the indicator shaft and indicator so that a warning section on the indicator is positioned for viewing through the lens.

BRIEF DESCRIPTION OF THE DRAWINGS

FIG. 1 is a perspective view of a distribution transformer with the internal fault indicator of the present invention;

FIG. 2 is a sectional view of the internal fault indicator of the present invention;

FIG. 3 is a sectional view of a second embodiment of the internal fault indicator of the present invention; and FIG. 4 is a plan view of the lens for the internal fault indicator of FIG. 3.

BEST MODE FOR CARRYING OUT THE INVENTION

With reference to FIG. 1, a pole mounted transformer 10 is illustrated having a transformer casing with a casing sidewall 12 which mounts the internal fault indicator 14 of the present invention. Although the internal fault indicator is shown mounted in an opening in the sidewall of the transformer casing for purposes of illustration, the internal fault indicator could be mounted in other walls of the transformer casing. In the conventional manner, the transformer is connected to a powerline 16 by a fuse assembly 18 which breaks the circuit in response to an overload condition.

Referring now to FIG. 2, the internal fault indicator 14 includes an open ended cylindrical housing 20 mounted in an opening 22 in the casing wall 12 of the transformer 10. A first open end of the housing, which is positioned externally of the transformer casing, is closed by a lens 24 secured in place on the housing. One half of this lens is opaque, as indicated at 26, to preclude viewing through this half of the lens, while the remaining half 28 of the lens is transparent to permit viewing.

A second open end of the housing 20 is closed by a diaphragm 30 which is spaced from the lens 24. This diaphragm is formed of spring metal or other suitable material which will resist flexure until a predetermined pressure is applied to diaphragm. To insure that the diaphragm will respond to pressure surges within the transformer casing and not to slow, gradual pressure rises due to external conditions and faults, a small bleed hole 32 is provided in the diaphragm to equalize pressure on both sides of the diaphragm when slow pressure rises occur. The diaphragm is secured to the housing 20 by a clamping ring 34.

The cylindrical housing 20 defines an internal chamber 36 which is closed by the lens 24 and the diaphragm 30. Supported for rotation within the chamber 36 is an indicator shaft 38 mounted in a central bushing 40 which forms part of a support spider structure 42 extending inwardly from the cylindrical wall of the housing 20. The lower end of the indicator shaft extends through a central opening 44 in the diaphragm. As shown in dotted lines, the diaphragm forms an annular flange around the opening 44 having a projecting portion 46 which operates as a trigger retainer. This trigger retainer engages a projecting trigger pin 48 mounted on the indicator shaft 38 in one position of the indicator shaft.

A biasing spring 50 has one end secured to the spider support structure 42 and a second end secured to the indicator shaft 38. An indicator disc 52 is secured to the indicator shaft above the biasing spring and is positioned adjacent to the underside of the lens 24. A warning half 54 of the surface of the indicator disc facing the lens is colored with a warning color, such as bright red, while a second non-warning half 56 of the surface of the indicator disc is neutral, white, or some other color which indicates a non-fault condition. The indicator shaft operates to rotate the indicator disc between a loaded and a warning position.

The internal fault indicator 14 is installed in the transformer casing with the indicator disc in a loaded position as shown in FIG. 2. In this loaded position, the warning half 54 of the indicator disc 52 is positioned beneath the opaque half of the lens 24 and the non-warning half 56 is positioned beneath the transparent half 28 of the lens. The bias spring 50 is substantially unbiased when the warning half of the indicator disc is positioned in a warning position beneath the transparent half of the lens, but with the indicator disc in the loaded position the coils of the spring tighten and bias the indicator shaft 38 for rotation in a direction to rotate the indicator disc from the loaded to the warning position of the indicator disc. When the indicator disc reaches the loaded position, the trigger pin 48 engages and is retained by the projecting trigger retainer 46.

In operation, the occurrence of an internal arcing fault within the transformer 10 will result in a rapid increase in pressure which is applied to the underside of the diaphragm 30. The bleed hole 32 is not large enough to rapidly balance the pressure resulting from this pressure surge on both sides of the diaphragm, and the diaphragm will flex inwardly toward the lens 24. This movement of the diaphragm raises the projecting trigger retainer above the trigger pin 48, and disengagement of the trigger pin permits the bias spring 50 to rotate the indicator shaft 180 degrees to relieve the tension on the bias spring. This rotation brings the warning half 54 of the indicator disc into the warning position beneath the transparent half 28 of the lens 24. The warning color is now readily visible, and no spring or other forces are present which will tend to move the indicator disc from this warning position. The internal fault indicator must be removed from the transformer casing or the lens 24 must be removed to reset the indicator disc to the loaded position.

A second embodiment of the internal fault indicator of the present invention is illustrated at 58 in FIGS. 3 and 4 where reference numerals used in FIG. 2 will be used to designate like components. The open ended cylindrical housing 20 of the internal fault indicator 58 is secured to the casing wall 12 of the transformer 10 by a mounting nut 60. A sealing gasket 62 prevents moisture from entering the transformer casing.

One end of the housing 20 is closed by a domed lens 64 having an opaque half 66 and a transparent half 68. Projecting from the inner surface at the center of the lens is a pivot peak 70 which engages the center of a dome shaped indicator 72 secured to the upper end of the indicator shaft 38. One half 74 of the indicator 72 is colored with a warning color, such as red, while the remaining half 76 is white, neutral or some color which indicates that no internal fault has occurred. One of two projections 78 and 80 on the bottom of the indicator, engages a stop 82 when the indicator is in its loaded and warning positions.

A combination compression and torsion spring 84 is secured at one end 86 to the indicator shaft and at a second end 88 to a spring retainer 90 formed in the center of the diaphragm 30. This spring operates in a manner similar to that of the spring 50 to bias the indicator shaft when the indicator 72 is in the loaded position. Thus, with the warning colored half 74 obscured by the opaque half 66 of the domed lens 64, the indicator shaft is biased for rotation toward the warning position where the colored half 74 is beneath the transparent half 68 of the lens. Additionally, the spring 84 biases the center of the diaphragm when the indicator 72 is in the loaded position so that the diaphragm will not respond to gradual pressure changes within the transformer casing.

The lower portion of the spring retainer 90 below the diaphragm 30 forms a trigger retainer 92 which engages a trigger pin 94 extending through the indicator shaft 38. The trigger pin is a roll pin mounted for rotation in the indicator shaft to engage two spaced downward projections in the trigger retainer when the indicator 72 is in the loaded position. As the diaphragm 30 moves inwardly in response to a pressure surge, the roll pin rotates to allow the projecting portions of the trigger retainer to move out of engagement with the roll pin. Now the spring 84 causes the indicator shaft 38 to rotate to bring the indicator to the warning position and into contact with the stop 82.

I claim:

1. An internal fault indictor adapted for mounting in an opening in the wall of a transformer casing comprising:
    an open ended housing defining an internal chamber;
    an indicator lens attached to said housing at a first open end thereof to close said first open end;
    a diaphragm attached to said housing at a second open end thereof opposite to and spaced from said indicator lens, said diaphragm being attached to close said second open end and operating to flex inwardly of said chamber toward said indicator lens from a first position to a second position in response to pressure surges within said housing sensed by said diaphragm;

trigger retaining means on said diaphragm;

an indicator shaft mounted for rotation within said housing and having a first end adjacent to said diaphragm and a second end adjacent to, but spaced from, said indicator lens;

an indicator mounted at the second end of said indicator shaft for rotation by said indicator shaft, said indicator being spaced beneath said indicator lens for observation through said indicator lens;

bias means connected to said indicator shaft to bias said indicator shaft toward rotation relative to said housing; and trigger means on said indicator shaft for contacting said trigger retaining means to prevent rotation of said indicator shaft in the first position of said diaphragm, said trigger retaining means operating to release said trigger means in the second position of said diaphragm to permit said bias means to rotate said indicator shaft.

2. The internal fault indicator of claim 1 wherein said indicator shaft operates to rotate said indictor between a loaded position and a warning position, said bias means operating with said indicator in the loaded position to bias said indictor shaft toward rotation in a direction to rotate said indicator from the loaded to the warning position.

3. The internal fault indicator of claim 2 wherein said indicator lens includes an opaque section and a transparent section and said indicator includes a warning section and a non-warning section, said trigger retaining means operating to contact and retain said trigger means when said indicator is rotated to the loaded position, and said diaphragm is in said first position, said warning section of said indicator being formed such that in the loaded position of said indicator the warning section is obscured by the opaque section of said indicator lens.

4. The internal fault indicator of claim 3 wherein said indictor is formed such that when said warning section is obscured by the opaque section of said indicator lens, said non-warning section is visible through the transparent section of said indicator lens.

5. The internal fault indicator of claim 3 wherein said warning section is positioned by said indictor shaft to be viewed through the transparent section of said indicator lens when said indicator is in the warning position.

6. The internal fault indicator of claim 5 wherein said indicator shaft projects through said diaphragm to position the first end thereof outside of said internal chamber, said trigger means and trigger retaining means being positioned outside of said internal chamber.

7. The internal fault indicator of claim 6 wherein said trigger means includes a pin projecting laterally from said indicator shaft, said trigger retaining means including at least one projection extending outwardly from said diaphragm for engaging said pin in the first position of said diaphragm when said indicator is in the loaded position.

8. The internal fault indicator of claim 5 wherein said bias means includes a torsion and compression spring connected between said indicator shaft and said diaphragm.

9. The internal fault indicator of claim 5 wherein said diaphragm includes a bleed opening to prevent slow increases of pressure within the transformer casing from moving the diaphragm.

* * * * *